United States Patent [19]

Tokumaru

[11] Patent Number: 5,313,607
[45] Date of Patent: May 17, 1994

[54] DIRECT MEMORY ACCESS CONTROLLER

[75] Inventor: Takeji Tokumaru, Yokohama, Japan

[73] Assignee: Kabushiki Kaisha Toshiba, Kawasaki, Japan

[21] Appl. No.: 659,240

[22] Filed: Feb. 22, 1991

[30] Foreign Application Priority Data

Feb. 22, 1990 [JP] Japan ................................ 2-039709

[51] Int. Cl.⁵ ............................................ G06F 12/02
[52] U.S. Cl. ............................ 395/425; 364/DIG. 1;
364/244.5; 364/259.5; 364/238.7
[58] Field of Search ... 364/200 MS File, 900 MS File;
395/400, 425

[56] References Cited

U.S. PATENT DOCUMENTS 4,507,731  3/1985  Morrison ............................ 395/425
4,845,640  7/1989  Ballard et al. ...................... 395/165
4,933,847  7/1990  Chau et al. ......................... 395/375
5,170,477  12/1992 Potter et al. ........................ 395/425

Primary Examiner—Joseph L. Dixon
Assistant Examiner—Hiep T. Nguyen
Attorney, Agent, or Firm—Foley & Lardner

[57] ABSTRACT

A DMA controller for supporting a data transfer operation between a first memory and a second memory includes a selector for selecting data stored in the first memory per data unit, a shifting circuit for shifting the data selected by the selector to one direction of required numbers, a F/F (flip-flop) for storing the data shifted by the shifting circuit for every data unit, a feedback circuit for feedback of the stored data by the F/F to the shifting circuit, and a transfer circuit for transferring the data stored in the F/F to the second memory.

4 Claims, 4 Drawing Sheets

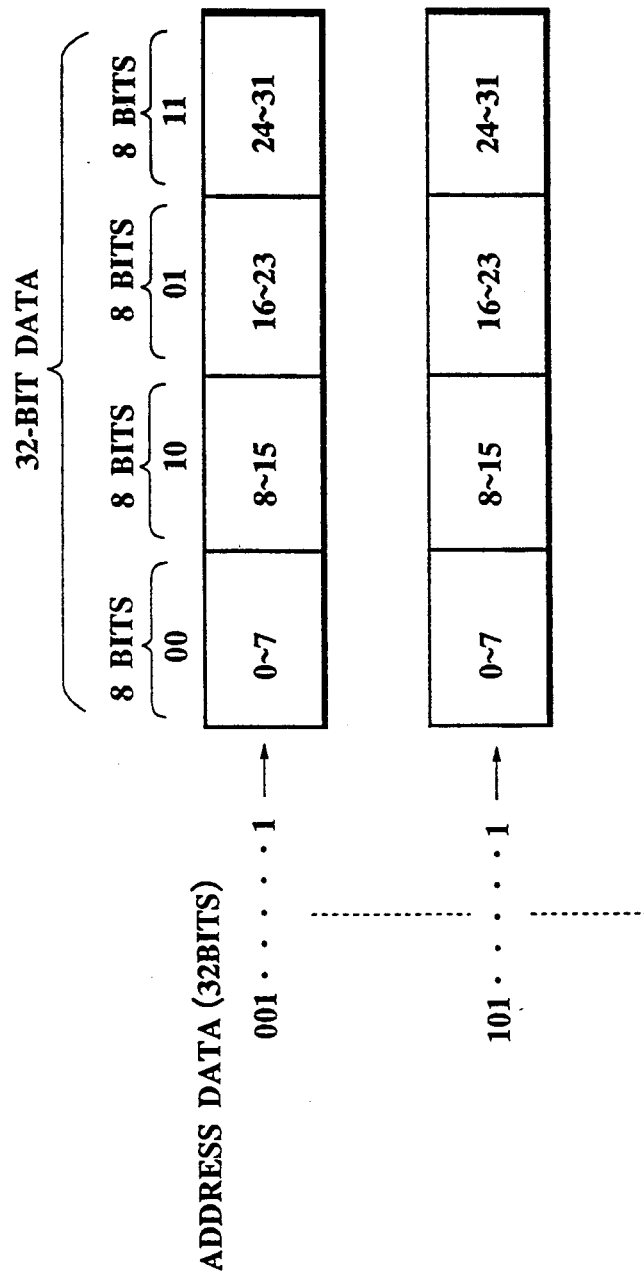

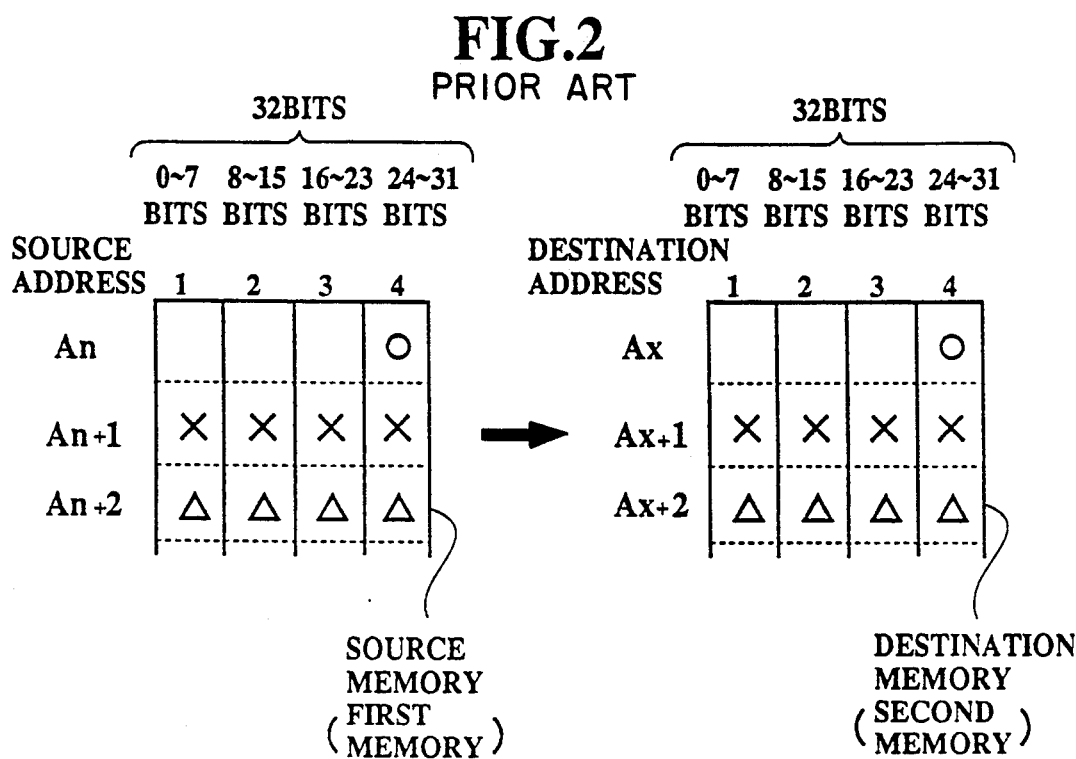
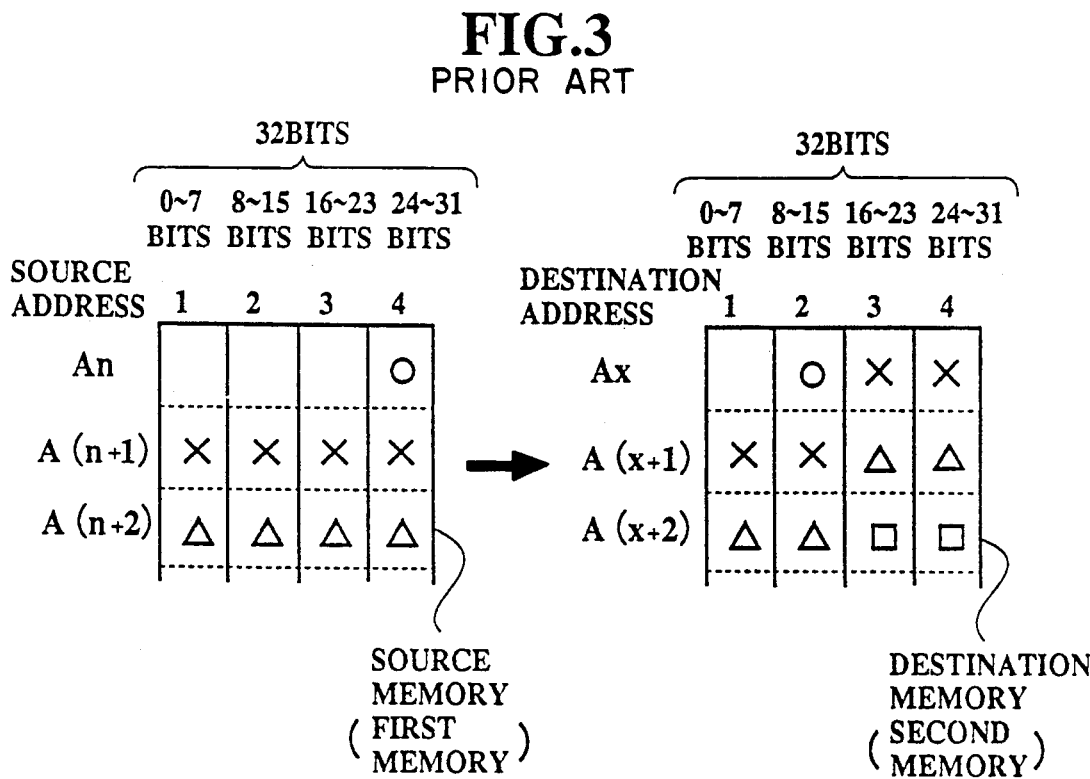

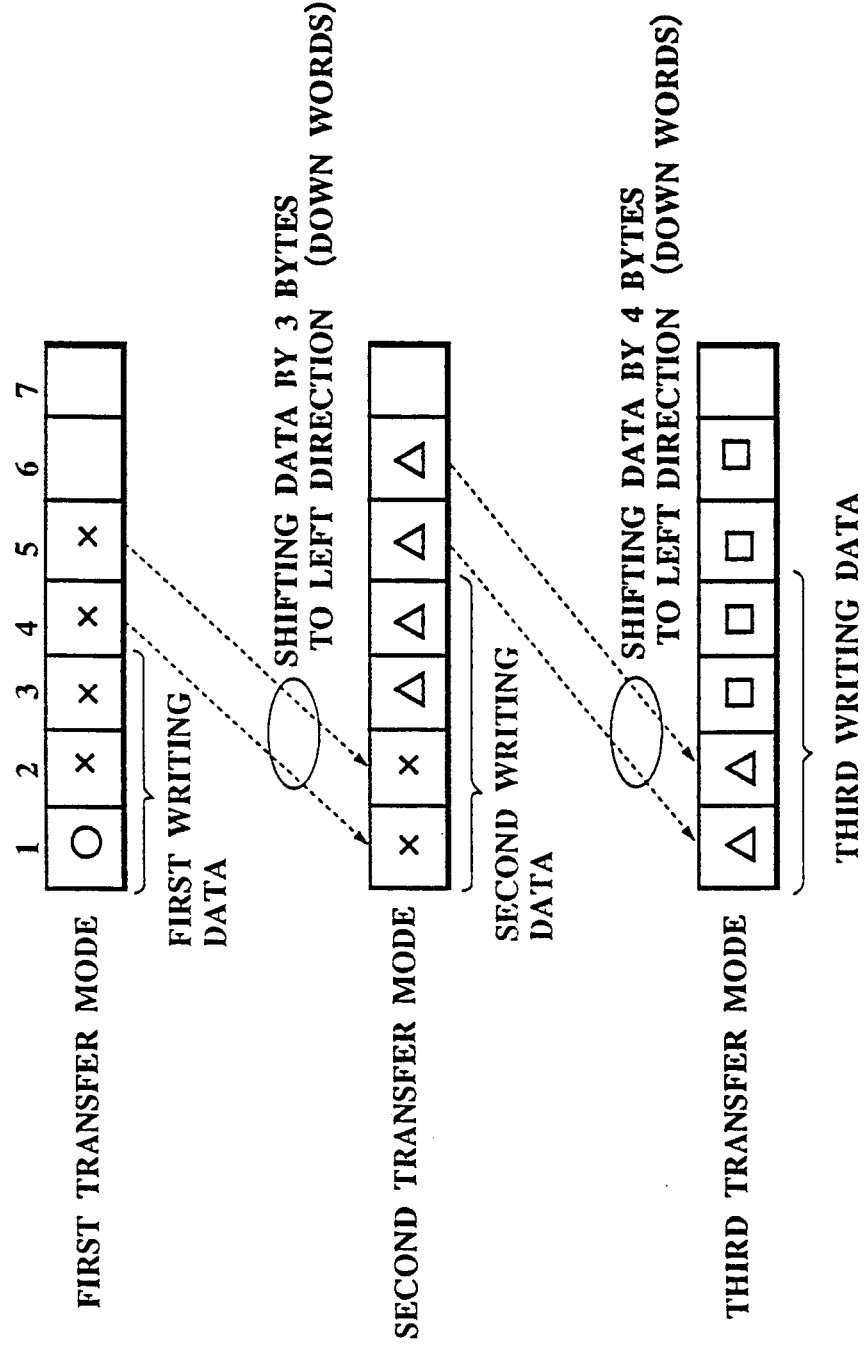

DIRECT MEMORY ACCESS CONTROLLER

BACKGROUND OF THE INVENTION

1. Field of the Invention

This invention relates to a DMA (Direct Memory Access) controller which is capable of executing efficiently a data transfer operation between memories in a misarrayed state.

2. Description of the Prior Art

Recently, data sizes handled by microprocessors have enlarged due to the development of computer technology.

Where the data size used in a microcomputer is 32 bits, in general, 8-bit data units can be also handled. For example, when the 32-bit data is addressed by using address data consisting of 32 bits, bits 0-1 in the address data designate any data unit in the 32-bit data. FIG. 1 shows the relationship between the address data and the 32-bit data. Any data unit of 8 bits can be selected by means of "00", "10", "01", and "11" designated by the first and second bits (0-1 bits) in the address data as shown in FIG. 1.

Thus, the data unit consisting of 8 bits or one byte can be transferred between two memories. Of course, the 32-bit data also can be transferred at one time between the memories in the conventional microprocessor.

For example, the 32-bit data is transferred between a source memory and a destination memory in an arrayed state, which means that a source address of data to be transferred in the source memory coincides with a destination address in the destination memory, so as to store the data transferred from the source memory.

FIG. 2 shows a relationship between the source address in the source memory and the destination address in the destination memory so as to explain the data transfer operation in the microprocessor.

In the same diagram, reference symbols "○", "x", and "Δ" designate data per byte. The source addresses of the data stored in the source memory to be transferred coincide correctly with the destination addresses in the destination memory, such as An and Ax, A(n+1) and A(x+1), and A(n+2) and A(x+2), each of which is 32-bit data. In such a case, each 32-bit data such as An, A(n+1), or A(n+2) can be transferred at one time from the source memory to the destination memory because two memories are in the same arrayment state.

On the other hand, the 32-bit data can not be transferred at one time from the source memory to the destination memory in a misarrayed state, which means that a source address of source memory data to be transferred does not coincide with a destination address, so as to store the data transferred from the source memory.

FIG. 3 shows a relationship between the source memory and the destination memory which are in the misarrayed state. In the same diagram, reference symbols "○", "x", and "Δ" designate data per byte. The source addresses of the data stored in the source memory to be transferred is different from the destination addresses in the destination memory such as An and Ax, A(n+1) and A(x+1), and A(n+2) and A(x+2), each of which is 32-bit data.

In the conventional microprocessor, a data transfer operation under the misarrayed state cannot be carried out at one time using a conventional DMA controller because it has no function for executing a data transfer operation under the misarrayed state.

Namely, the 32-bit data stored in the source memory cannot send at one time to the destination memory under the control of the conventional DMA controller.

Accordingly, when the data should be transferred between the two memories under the misarrayment state, the following operations are required to complete transfer of the data, as shown in FIG. 3:

First step: The fourth data unit of 8-bits designated by the reference character "○," addressed by the fourth address, in the source address An, in the source memory, is sent to the second portion denoted by the reference symbol "○" in the second address, Ax, in the destination memory as shown in FIG. 3.

Second step: The first and second data designated by "x x" addressed by the first and second addresses in the source address, A(n+1), in the source memory are transferred into the third and fourth portion shown by the "x x" addressed by the third and fourth addresses in the destination address, Ax, in the destination memory, as shown in FIG. 3.

Third step: The third and fourth data designated by "x x" addressed by the third and fourth addresses in the source address, A(n+1), are transferred to the first and second portions shown by "x x" addressed by the first and second addresses in the destination address, A(x+1), in the destination memory.

When the source addresses of the data to be transferred are different from the destination addresses of the portions into which the data are stored, the three steps described above are required. As a result, the operational efficiency of the microprocessor is reduced.

Summarizing the conventional DMA's problem in the prior art, as described above, there is no DMA controller which can support the data transfer operation between memories under the misarrayed state so that many operations and much time are required for the data transfer operation.

SUMMARY OF THE INVENTION

An object of the present invention is to provide a Dynamic Memory Access (DMA) controller which is capable of decreasing data transfer time between memories which are in a misarrayed state.

So as to achieve the object, the DMA controller for supporting a data transfer operation between a first memory and a second memory, includes a selecting means for selecting data stored in the first memory per unit of data, a shifting means for shifting the data selected by the selecting means to one direction of required numbers, a storage means for storing the data shifted by the shifting means into it for every unit of data, a feedback means for feedback of the stored data by the storage means to the shifting means, and a transfer means for transferring the data stored in the storing means to the second memory.

In the DMA controller having the above construction, the data to be transferred between the first and the second memories are arranged in accordance with an arrangement state of address in the second memory in which the data are stored.

Accordingly, higher throughput of the microprocessor with the DMA controller is possible, because efficiency of the data transfer operation can be increased by using the DMA controller according to the present invention.

The object, features and advantages of the present invention will be more apparent from the following description of a preferred embodiment, taken in conjunction with the accompanying drawing.

BRIEF DESCRIPTION OF THE DRAWINGS

FIG. 1 shows a data construction used for data transfer operation in a conventional DMA controller;

FIG. 2 shows a relationship between two memories in an arrayed state;

FIG. 3 shows a relationship between two memories fallen under a misarrayment state;

FIG. 5 shows data transfer modes by using the DMA controller, as shown in FIG. 4, in the misarrayed state.

DETAILED DESCRIPTION OF THE EMBODIMENTS

Figure 4:
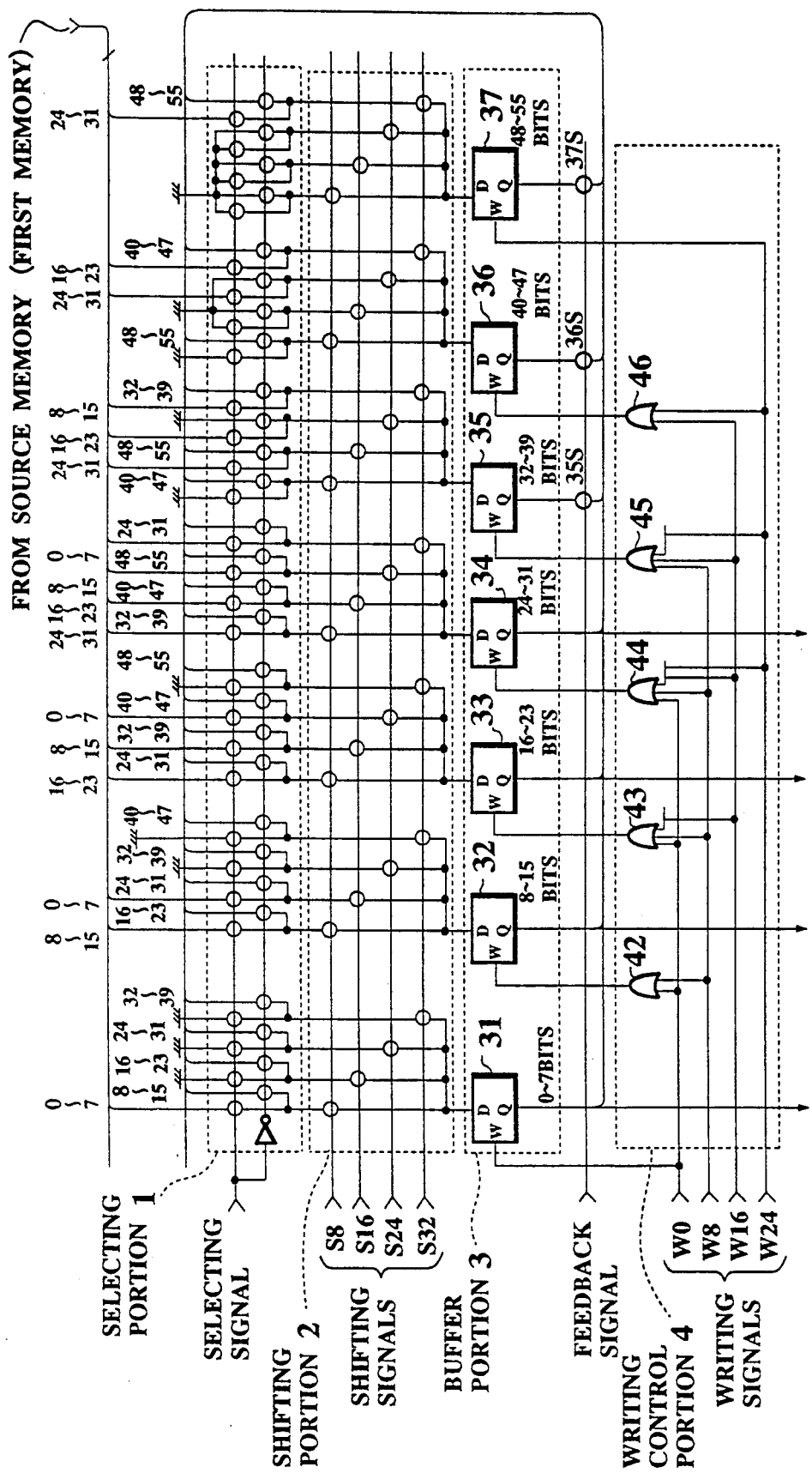
FIG. 4 shows a block diagram of a DMA controller of an embodiment according to the present invention.

Hereinafter, we explain an embodiment according to the present invention with reference to the drawings.

FIG. 4 shows a block diagram of a DMA controller of an embodiment according to the present invention. In the same diagram, the source memory (shown in FIG. 3) as a first memory and the destination memory (shown in FIG. 3) as a second memory have fallen into the misarrayed state which means that a source address of source memory data to be transferred does not coincide with a destination address so as to store the data transferred from the source memory.

The DMA controller of the embodiment operates efficiently a data transfer operation between the first and the second memories.

First, the DMA controller's construction will be explained.

The DMA controller comprises a selecting portion 1 as a selecting means, a shifting portion 2 as a shifting means, a buffer portion 3 as a storage means, and a writing control portion 4 as a transfer means, as shown in FIG. 4.

The selecting portion includes many selectors having an upper portion and a lower portion, which are handled by a selecting signal so as to open or close them and are designated by the reference symbol "◯".

These selectors can select every byte (8 bits) whether data sent from the source memory (not shown in FIG. 4) are selected or data is fed back from the buffer portion 3. When a level of the selection signal is "1", the selectors of the upper portion are in an "ON" state so as to receive data transferred from the source memory. At this time, the selectors of the lower portion are in an "OFF" state.

When the level of the selecting signal is "0", the selectors of the lower portion are in the "ON" state so as to receive data fed back from the buffer portion 3. At this time, the selectors of the upper portion are in an "OFF" state.

Moreover, selectors grounded to the earth are placed into a floating state in which these selectors cannot be opened when the selectors are in "ON" state.

The selected data are transferred into the shifting portion 2 by the selection portion 1.

The shifting portion 2 includes many selectors also designated by the reference symbols "◯".

In the shifting portion 2, the state of each selector is controlled by shifting signals which are designated "S8", "S16", "S24", and "S32" as shown in FIG. 4.

The data of 32-bits transferred from the source memory through the selecting portion 1 are shifted to the right direction (upwards as the upper direction of the data) by any bytes based on a state obtained by the combination of shifting signals S8, S16, S24, and S32.

For example, when the shifting signal S8 is "1" and other shifting signals S16, S24, and S32 are "0", the data of 32-bits transferred from the selecting portion 1 is shifted to the right (downwards as the upper direction of the data) zero (0) byte.

When the shifting signal S16 is "1" and other shifting signals S8, S24, and S32 are "0", the data is shifted to the right direction 1-byte (8-bits).

Then, when the shifting signal S24 is "1" and other shifting signals S8, S16, and S32 are "0", the data is shifted to the right 2-bytes (16-bits).

Similarly, the shifting signal S32 is "1" and other shifting signals S8, S16, and S24 are "0", the data is shifted to the right direction of 3-bytes (24-bits).

On the other hand, when the data of 32-bits fed back from the buffer portion 3 through the selecting portion 1 are shifted to the left (the lower direction of the data) by any bytes based on a state obtained by the combination of these shifting signals S8, S16, S24, and S32.

For example, when the shifting signal S8 is "1" and other shifting signals S16, S24, and S32 are "0", the data of 32-bits transferred from the selecting portion 1 is shifted to the left (or the lower direction of the data) zero (0) byte.

When the shifting signal S16 is "1" and other shifting signals S8, S24, and S32 are "0", the data is shifted to the left 1-byte (8-bits).

When the shifting signal S24 is "1" and other shifting signals S8, S16, and S32 are "0", the data is shifted to the left of 2-bytes (16-bits).

Similarly, when the shifting signal S32 is "1" and other shifting signals S8, S16, and S24 are "0", the data is shifted to the left 3-bytes (24-bits).

The buffer portion 3 includes seven flip flops F/F 31 to 37. The data shifted by the shifting portion 2 are stored into the F/Fs 31 to 37, each of which can store data of 8-bits (one byte).

F/F 31 stores a part of 0-7 bits observed from the left direction, or the lower direction of the data, transferred from the shifting portion 2, the F/F 32 stores a part of 8-15 bits of it, the F/F 33 stores a part of 16-23 bits of it, the F/F 34 stores a part of 24-31 bits of it, the F/F 35 stores a part of 32-39 bits of it, the F/F 35 stores a part of 40-47 bits, and the F/F 36 can store a part of 48-55 bits of the data.

The data stored in the F/Fs 31 to 37 are fed back to the selecting portion 1 by the selectors 35S, 36S, and 37S controlled by a feedback signal FB.

When the feedback signal FB becomes "1", the selectors 35S, 36S, and 37S are in "ON" state or ready so that the data stored in the F/Fs 35, 36, and 37 are fed back to the selecting portion 1. When the feedback signal FB becomes "0", the selectors 35S, 36S, and 37S are in "OFF" state, so that the data stored in the F/Fs 35, 36, and 37 are not fed back to the selecting portion 1.

The writing control portion 4 controls a writing operation in which the data held in the F/Fs 31 to 37 are transferred to the destination memory depending on the state of the OR gates 42 to 46. Namely, when a writing signal W0 becomes "1", the output of each F/F 42, 43, and 44 are "1", respectively, so as to put them in a writing mode in which the data stored in the F/Fs 42, 43, and 44 can be read if required.

When the writing signal W8 becomes "1", the output of the OR gates 42, 43, 44, and 45 are "1" so that the F/Fs 32, 33, 34, and 35 are placed into the writing mode.

When the writing signal W16 becomes "1", the output of the OR gates 43, 44, 45, and 46 are "1" so that the F/Fs 33, 34, 35, and 36 are fallen into the writing mode.

When the writing signal W24 becomes "1", the output of the OR gates 44, 45, and 46 are "1" so that the F/Fs 34, 35, 36, and 37 are placed into the writing mode.

The DMA controller of the present embodiment according to the present invention is constructed as described above.

The operation of the DMA controller of the present embodiment is explained by referring to FIG. 5, which is an illustration showing first to third transfer modes for a data transfer operation of the DMA controller, as shown in FIG. 4. The data transfer operation between the source memory and the destination memory in FIG. 3 which are in the misarrayed state is executed by the DMA controller.

In the first transfer mode, as shown in FIG. 5, data of 3-bytes can be stored at time in the second to fourth memory elements (designated by "○", "x x" in the row Ax) in the first row designated by the destination address Ax in the destination memory (FIG. 3). Namely, the data of one byte stored in the fourth column in the first row An and the data of 2-bytes kept in the first and second columns in the second row A(n+1) in the source memory (FIG. 3) are transferred into the buffer portion 3. This transfer operation will now be described in detail as follows:

First, the selecting signal, the shifting signal S8, and the writing signal W0 are set to "1" and the feedback signal FB is set in "0", so that the data of 1-byte (24-31 bits) stored in the fourth column in the first row, An, in the source memory is selected by the selecting portion 1, then stored into the F/F 34 in the buffer portion 3 through the shifting portion 2 where the shifting operation is not executed. At the same time, the F/Fs 31 to 33 are also placed in the writing mode, like the F/F 34, so that meaningless data kept in the first to third columns in the source address, An, in the source memory are stored in the F/Fs 31 to 33. However, correct data are written into the F/Fs 31 to 33 in the following operation.

Next, the selecting signal becomes "0" and the shifting signal, the feedback signal FB, and the writing signal W0 are set to "1" so that the data stored in the F/F 34 are fed back to the selecting portion 1. Then the data are transferred to the shifting portion 2 through the selecting portion 1. The data are shifted downwards by 24 bits so as to be stored into the F/F 31 (which is a memory so as to store data of 0 to 7 bits in the buffer portion 3) because the shifting signal S24 is "1" and the other shifting signals are "0" in the shifting portion 2.

Next, the selecting signal, the shifting signal S16, and the writing signal W8 become "1" and the feedback signal FB is "0", so that the data of 4-bytes (0-31 bits) stored in the first to fourth column and the second row A(n+1) in the source memory are selected by the selecting portion 1, then shifted upwards by 8-bits so as to be stored into the F/Fs 32 to 35 in the buffer portion 3.

As the first transfer mode shown in FIG. 5, the data stored in the first column in the second row A(n+1) in the source memory are transferred into the F/F 32 (shown in FIG. 3), the data in the second, third, and fourth columns in the second row in source memory are sent into the F/Fs 33, 34, and 35. Thus, the transfer operations from the source memory to the buffer portion 3 are completed.

Next, the data (0 to 23 bits) stored in the F/Fs 31 to 33 are shifted upwards by 8 bits by the shifting portion 2, then transferred to memory portions designated by the row Ax in the destination memory. This means that the data of the fourth column in the first row, An, and the data of the first and the second columns in the second row, A(n+1), are connected to each other, then stored into the second to fourth columns in the second row A(x+1) in the destination memory.

Thus, the first transfer operation from the source memory to the destination memory is completed.

In the second transfer operation, the data of 4-bits stored in the source memory addressed by the source address, A(n+1), as shown in FIG. 3, are transferred to the buffer portion 3 so as to combine them with the data which have been already stored in the buffer portion 3. Then the data stored in the buffer portion 3 are sent into the destination memory addressed by the destination address A(x+1).

The second transfer operation will be further explained below. First, the selecting signal is set to "0" and the the shifting signal S24, the feedback signal FB, and the writing signal W0 are set in "1", so that the data stored in the F/Fs 34 and 35 in the buffer portion 3 are fed back to the shifting portion 2 through the selecting portion 1, so as to shift them downwards (to left direction) by three bytes, and are then stored into the F/Fs 31 and 32.

In other words, the data stored in the source memory addressed by the third byte (16-23 bits) in the source address A(n+1) are transferred into the F/F 34 in the first transfer operation, then stored into the F/F 31 in the second transfer operation. Moreover, the data stored in the source memory addressed by the fourth byte (24-31 bits) in the source address A(n+1) are transferred into the F/F 35 in the first transfer operation, then stored into the F/F 32 in the second transfer operation.

Next, the selecting signal, the shifting signal, and the writing signal are set to "1" and the feedback signal FB is set to "0". Then the data of 4-bytes stored in the source memory addressed by the source address A(n+2) are selected by the selecting portion 1, then shifted upwards (to right direction) by 16 bits by the shifting portion 2, so as to store them into the F/Fs 33-36. As clearly shown by the second transfer mode in FIG. 5, the data transferred from the source memory addressed by the first byte in the source address A(n+1) are stored in the F/F 33 (16-23 bits), the data addressed by the second byte in it are held in F/F 34 (24-31 bits), the data addressed by the third byte in it are kept in the F/F 35 (32-39 bits), and the data addressed by the fourth byte in it are sent to the F/F 36 (40-47 bits).

Thus, the second transfer operation is completed.

When the number of the first byte in the source address of data to be transferred is defined as the "SOURCE ADDRESS38 , the number of the first byte in the destination address of the data transferred from the source memory is set as the "DESTINATION ADDRESS", so that the "LOCATION OF F/F" for storing the data transferred from the source memory is determined according to the following equations:

LOCATION OF F/F=4−SOURCE ADDRESS+DESTINATION ADDRESS where SOURCE ADDRESS > DESTINATION ADDRESS;

LOCATION OF F/F = DESTINATION ADDRESS − SOURCE ADDRESS where SOURCE ADDRESS < DESTINATION ADDRESS.

The states of the writing signals W0, W8, W16, and W24 are set on the basis of a location of F/F, as defined above.

For example, in the present embodiment, the number of a source address is "0" and the number of a destination address is "2", so that the number of the F/F to store data transferred from the source memory becomes "2". Thereby, the writing signal W16 becomes "1" so as to write the data into the F/F 33.

The number of shifting in the shifting portion 2 is determined by the number of the byte transferred from the buffer portion 3 to the destination memory.

Namely, in the first transfer operation, the data of 3-bytes can be transferred to the destination memory so that the number of shifting becomes 3. On the other hand, in the second transfer operation, the number of shifting is 4 because the data of 4-bytes are transferred into the destination memory.

Next, in the situation described above, the data of 0-31 bits stored in the F/Fs 31-34 are transferred to the destination memory addressed by the destination address $A(n+1)$, so that the data addressed by the third and the fourth bytes in the source address $A(n+1)$ and the data addressed by the first and the second bytes in the source address $A(n+2)$ are connected to each other, then transferred into the destination memory addressed by the first to fourth bytes in the destination address $A(x+2)$.

Thus, the second transfer operation is completed.

Next, the third transfer operation will be explained as follows:

First, the selecting signal is set to "0". The shifting signal S32, the feedback signal, and the writing signal W0 are set in "1".

Thereby, the data stored in the F/Fs 35 and 36 by the second transfer operation are fed back to the selecting portion 1, then shifted downwards by 4-bytes by the shifting portion 2 so as to store them into the F/Fs 31 and 32. Like the second transfer operation, data of 4-bytes sent from the source memory are stored into the buffer portion 3, then the data stored in the F/Fs 31 to 34 are transferred to the destination memory so as to store them in it, as shown by the third transfer mode in FIG. 5.

In this way, the third transfer operation is completed. Later data transfer operations can be performed repeatedly in the same moment as the first to third operations.

As described above, a data transfer operation in the misarrayed state between two memories, such as the source memory and the destination memory in the embodiment, can be executed with three data transfer operations such that data stored in the source memory are transferred to the destination memory addressed by the destination address $A(x+2)$ by means of the DMA controller according to the present invention. These operations are carried out only in the DMA controller.

Thus, number of the transfer operations in the misarrayed state with the DMA controller of the present invention is approximately as same as that in the arrayed state with a conventional DMA controller. By using the DMA controller according to the present invention in a microprocessor, a high speed a operation can be achieved.

Various modifications will become possible for those skilled in the art, in view of the teaching of the present disclosure, without departing from the scope thereof.

What is claimed is:

1. A direct memory access (DMA) controller for supporting data transfer operations between a first memory means and a second memory means in a misarrayed state, comprising:
   selecting means for receiving and selecting data items;
   shifting means for shifting the data items selected by the selecting means in a predetermined direction;
   storage means for storing the data items shifted by the shifting means per unit of the data items;
   feedback means for feeding back the data items from the storage means to the selecting means; and
   transfer means for transferring the data items to the second memory means when the data items have an address arrangement state which is the same as an address arrangement of the second memory means,
   wherein the unit of the data items for data transfer is one byte, the selecting means includes a plurality of selectors having logic states determined by selection signals provided from outside the DMA controller, and the selecting means inputs the data items from the first memory means and the storage means.

2. A direct memory access (DMA) controller according to claim 1, wherein the shifting means comprises a plurality of selectors, the logic states of each selector being determined by shifting signals provided from outside of the DMA controller, and wherein
   the data items from the selecting means are shifted by a combination of the logic states of the selectors in the shifting means.

3. A direct memory access (DMA) controller according to claim 1, wherein
   the transfer means comprises OR circuits, predetermined signal lines, and output data lines connected to the storage means and the second memory means, and
   the transfer means is controlled by transfer signals provided from outside of the DMA controller, and the data items in the storage means are shifted to the second memory means by a combination of the logic states of the signal lines based on the transfer signals.

4. A method of controlling a data transfer operation between a first memory means and a second memory means by a direct access memory access (DMA) controller, the method comprising the steps of:
   (1) inputting and selecting data items in units of one byte by selecting means controlled by selecting signals provided from outside the DMA controller;
   (2) shifting the data items from the selecting means in a predetermined direction by shifting means controlled by shifting signals provided from outside of the DMA controller;
   (3) storing the data items from the shifting means in a storage means;
   (4) feeding the data items in the storage means back to the selecting means by feedback means; and
   (5) transferring the data items from the storage means to the second memory means under control of transfer signals provided from outside of the DMA controller.

* * * * *